(12) United States Patent
Yen

(10) Patent No.: US 7,392,529 B2
(45) Date of Patent: Jun. 24, 2008

(54) OPTICAL DISC DRIVE

(75) Inventor: Chia-Hung Yen, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 406 days.

(21) Appl. No.: 11/160,560

(22) Filed: Jun. 29, 2005

(65) Prior Publication Data
US 2006/0225086 A1 Oct. 5, 2006

(30) Foreign Application Priority Data
Mar. 30, 2005 (TW) .............................. 94109939 A

(51) Int. Cl.
*G11B 33/14* (2006.01)
*G11B 33/02* (2006.01)
(52) U.S. Cl. ................... 720/650; 720/601; 720/646
(58) Field of Classification Search ......... 720/601–616, 720/646, 647, 650
See application file for complete search history.

(56) References Cited

U.S. PATENT DOCUMENTS

| 7,089,569 | B2 * | 8/2006 | Matsui et al. ............... 720/611 |
| 2004/0128677 | A1 * | 7/2004 | Matsui et al. ............... 720/611 |
| 2006/0010461 | A1 * | 1/2006 | Hamada et al. ............. 720/600 |

FOREIGN PATENT DOCUMENTS

| JP | 08297963 A | * | 11/1996 |
| JP | 2003218574 A | * | 7/2003 |
| JP | 2004087005 A | * | 3/2004 |
| JP | 2004152433 A | * | 5/2004 |
| JP | 2005078771 A | * | 3/2005 |
| KR | 2004040726 A | * | 5/2004 |
| KR | 2005076300 A | * | 7/2005 |

* cited by examiner

*Primary Examiner*—William J Klimowicz
(74) *Attorney, Agent, or Firm*—Jianq Chyun IP Office

(57) ABSTRACT

An optical disc drive includes an electro-conductive chassis, a tray, a bezel and an electro-conductive sheet. Wherein, the electro-conductive chassis has an opening portion. The tray is disposed inside the electro-conductive chassis for carrying an information storage medium and can move into and from the electro-conductive chassis, and the bezel is disposed at a front edge of the tray. In addition, the electro-conductive sheet is disposed between the front edge of the tray and the bezel, and substantively covers the opening portion of the electro-conductive chassis. As the tray stays inside the electro-conductive chassis, the electro-conductive sheet is in contact with the electro-conductive chassis. Consequently, the electro-conductive sheet is able to reduce the electromagnetic interference (EMI) generated during the operating of the optical disc drive. Further, the electromagnetic wave leakage damaging human health is also prevented.

6 Claims, 5 Drawing Sheets

OPTICAL DISC DRIVE

CROSS-REFERENCE TO RELATED APPLICATION

This application claims the priority benefit of Taiwan application serial no. 941 09939, filed on Mar. 30, 2005. All disclosure of the Taiwan application is incorporated herein by reference.

BACKGROUND OF THE INVENTION

1. Field of Invention

The present invention relates to an optical disc drive, and particularly to a optical disc drive having a structure for reducing electromagnetic interference (EMI).

2. Description of the Related Art

As a storage medium, optical discs have the advantages such as cheap, portable, capable of storing enormous memory, convenient to maintain, long-lasting, low cost and durable. Along with such advantages, at present optical discs are gradually replacing the conventional magnetic storage medium and have become an indispensable optical storage medium for modern life. Due to broad applications of optical discs, optical disc drives for reading data recorded on optical discs have become a common electronic product in our daily life.

Referring to FIG. 1, it is a schematic three-dimensional drawing of a conventional optical disc drive. The conventional optical disc drive 100 comprises an electro-conductive chassis 110, a tray 120, a bezel 130, an optical disc reading mechanism 140 and a slide rail 150. Wherein, the electro-conductive chassis 110 has an opening portion 112 for the tray 120 to move in to and out from the inner space of the electro-conductive chassis 110 along the slide rail 150. The optical disc reading mechanism 140 comprises a turntable 142 and an optical pick-up 144 disposed on the tray 120. The bezel 130 is attached to the tray 120. When the tray 120 slips into the electro-conductive chassis 110, the bezel 130 covers the opening portion 112 for preventing the optical disc drive 100 from getting outside dust.

While the optical pick-up 144 of the optical disc drive 100 is reading an optical disc (not shown in FIG. 1), the optical disc drive 100 produces an electromagnetic wave with high frequency and high energy. Since the bezel 130 of the optical disc drive 100 is made of plastic material, the electromagnetic wave is very easy to penetrate through the bezel 130 out of the optical disc drive 100. The leaked electromagnetic wave will cause an electromagnetic interference (EMI) to the surrounding electronic apparatuses.

The EMI produced by a conventional optical disc drive makes negative impact not only on other electronic devices in the computer, but also on human health. This is the reason why most countries have established strict regulations on the electromagnetic wave intensity generated by electronic products. How to reduce the EMI produced by the optical disc drive in operation and how to prevent the electromagnetic wave from leaking that results in harming human health are consequently a significant project.

SUMMARY OF THE INVENTION

In view of the above-described, an object of the present invention is to provide an optical disc drive suitable for preventing the generated electromagnetic wave from leaking out of the bezel.

To fulfill the above-mentioned object, the present invention provides an optical disc drive, comprising an electro-conductive chassis, a tray, a bezel, and an electro-conductive sheet. Wherein, the electro-conductive chassis has an opening portion. The tray is disposed inside the electro-conductive chassis for carrying an information storage medium and moves into and from the electro-conductive chassis via the opening portion. The bezel is disposed at a front edge of the tray. In addition, the electro-conductive sheet is disposed between the front edge of the tray and the bezel and substantively covers the opening portion of the electro-conductive chassis. Wherein, when the tray stays inside the electro-conductive chassis, the electro-conductive sheet is in contact with the electro-conductive chassis.

According to the preferred embodiment of the present invention, the above-mentioned electro-conductive sheet has a curling edge structure, by which the electro-conductive sheet is in contact with the electro-conductive chassis.

According to the preferred embodiment of the present invention, the above-mentioned electro-conductive chassis is made of, for example, metal; and the above-mentioned electro-conductive sheet may also made of metal. Besides, it is a preferred design that the above-mentioned bezel is capable of covering the opening portion of the electro-conductive chassis.

To sum up, the optical disc drive of the present invention is equipped with an electro-conductive sheet, which is disposed between the bezel and the front edge of the tray, so that the electro-conductive sheet comes into contact with the electro-conductive chassis when the tray stays inside the electro-conductive chassis. In this way, the electro-conductive sheet with the electro-conductive chassis together as a conductive enclosing case for shielding the electromagnetic wave will make the induced electromagnetic field thereon grounded. Consequently, the electromagnetic interference (EMI) generated by the operating optical disc drive can be reduced, which further prevents the electromagnetic wave from leaking that puts human health in jeopardy.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 1:
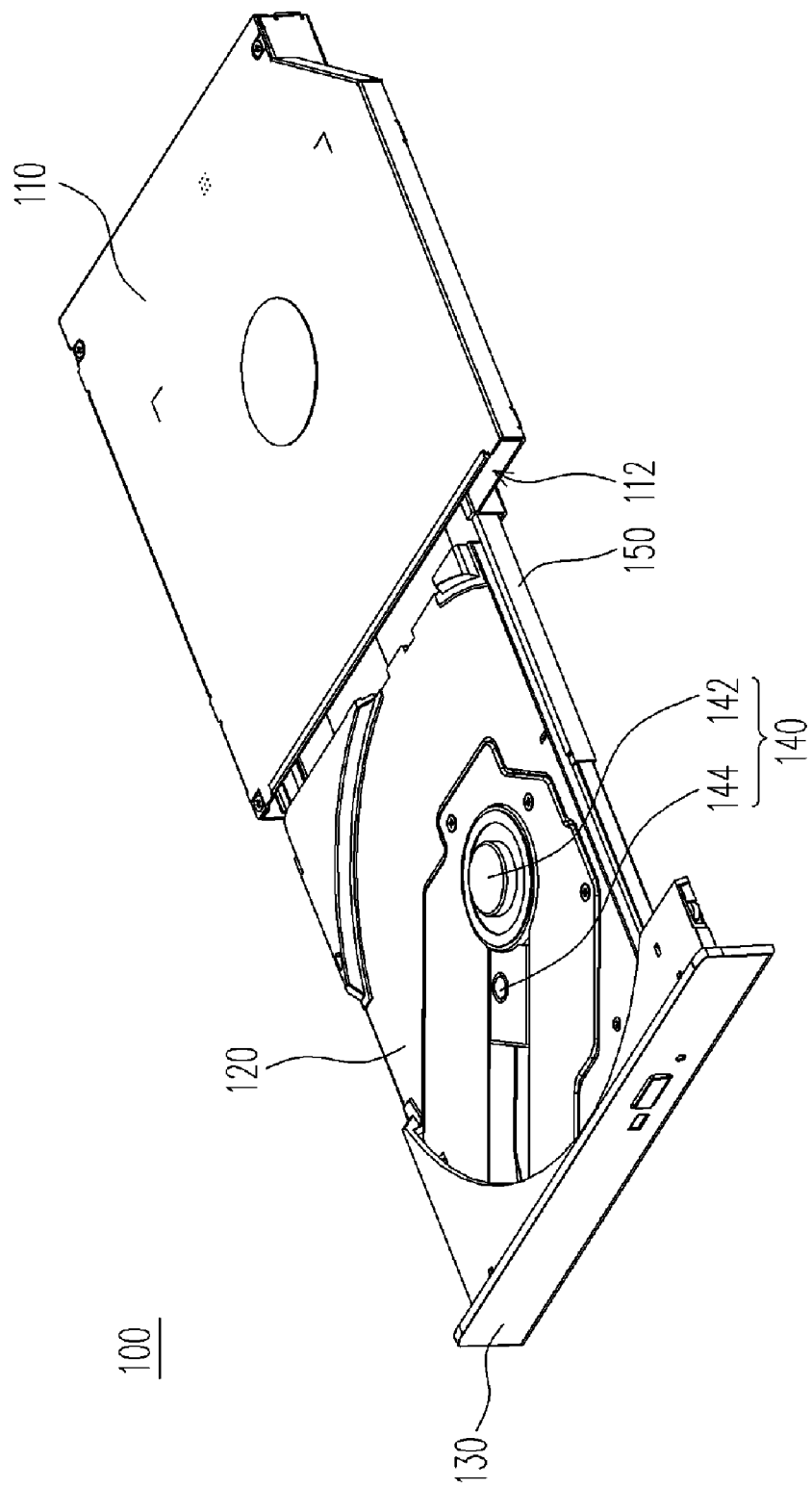
FIG. 1 is a schematic three-dimensional drawing of a conventional optical disc drive.
Figure 2:
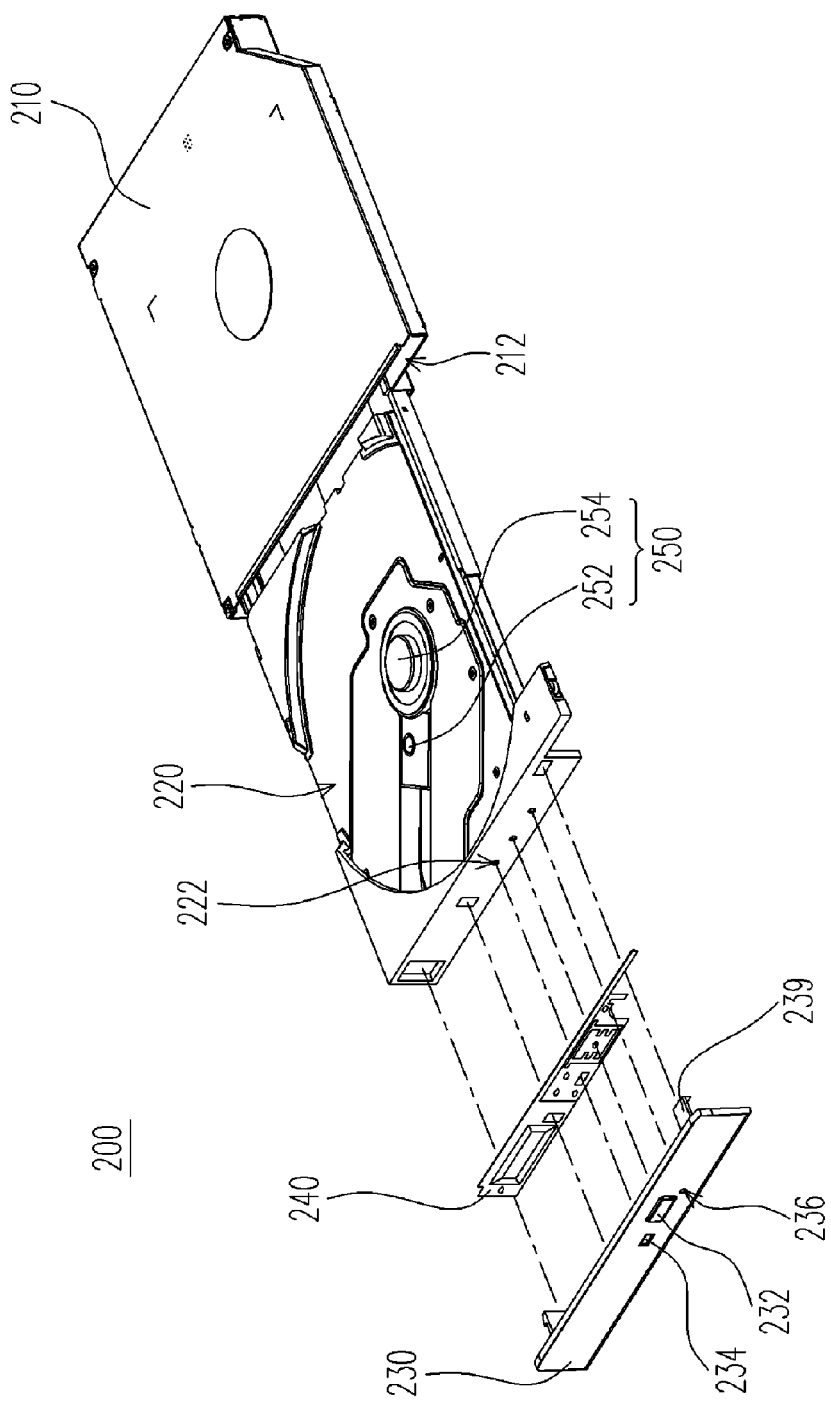
FIG. 2 is a schematic three-dimensional explosion drawing of an optical disc drive in an embodiment of the present invention.

Referring to FIG. 2, FIG. 2 is a schematic three-dimensional explosion drawing of an optical disc drive in an embodiment of the present invention. An optical disc drive 200 is used for reading data from and writing data into CDs, DVDs or optical discs in other formats (not shown in FIG. 2). The optical disc drive 200 in the embodiment comprises an electro-conductive chassis 210, a tray 220, a bezel 230, and an electro-conductive sheet 240. Wherein, the electro-conductive chassis 210 is made of metal or other electro-conductive materials. The electro-conductive chassis 210 has an opening portion 212 to provide the tray 220 to move into and out from the optical disc drive 200. The tray 220 is disposed inside the electro-conductive chassis 210 for carrying an information storage medium (optical disc, for example), and moves into and from the electro-conductive chassis 210 via the opening portion 212.

Figure 3:
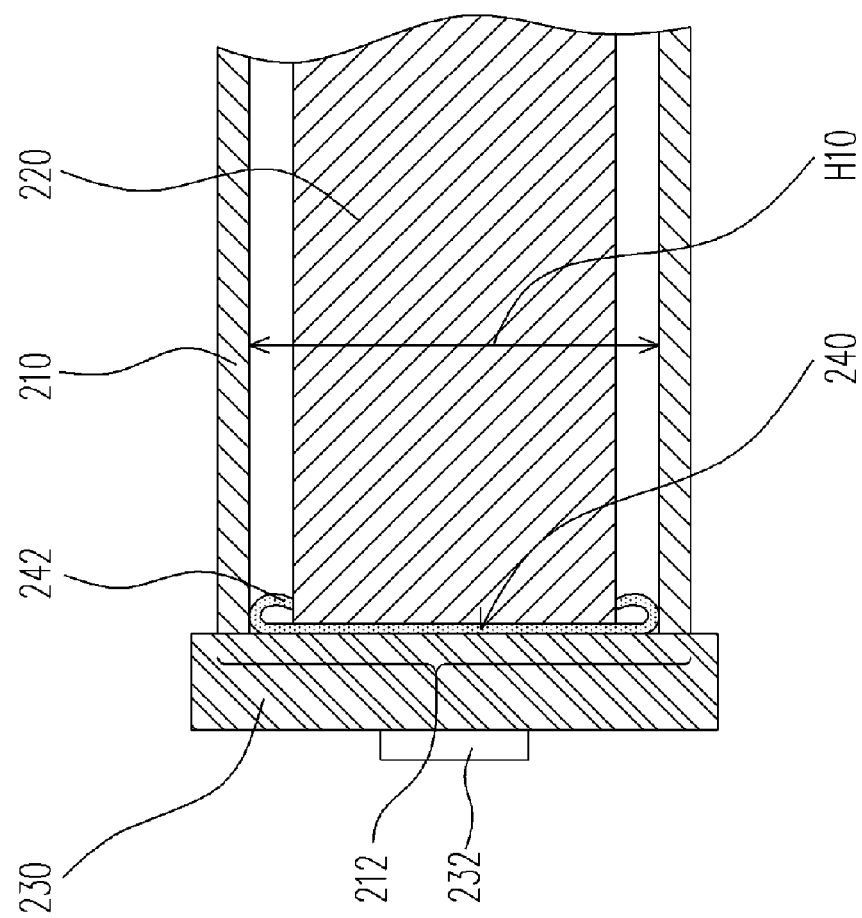
FIG. 3 is a schematic section drawing of the tray-bezel assembly in FIG. 2.

Referring to FIGS. 2 and 3, FIG. 3 is a schematic section drawing of the tray-bezel assembly in FIG. 2. The bezel 230 is disposed at the front edge of the tray 220. As the tray 220 stays in the electro-conductive chassis 210, the bezel 230 covers the opening portion 212 for preventing the optical disc drive 200 from getting outside dust. The electro-conductive sheet 240 is made of, for example, metal or other electro-conductive materials and disposed between the front edge of the tray 220 and the bezel 230. Furthermore, the electro-conductive sheet 240 substantively covers the opening portion 212 of the electro-conductive chassis 210. When the tray 220 stays inside the electro-conductive chassis 210, the electro-conductive sheet 240 is in contact with the electro-conductive chassis 210.

Figure 4:
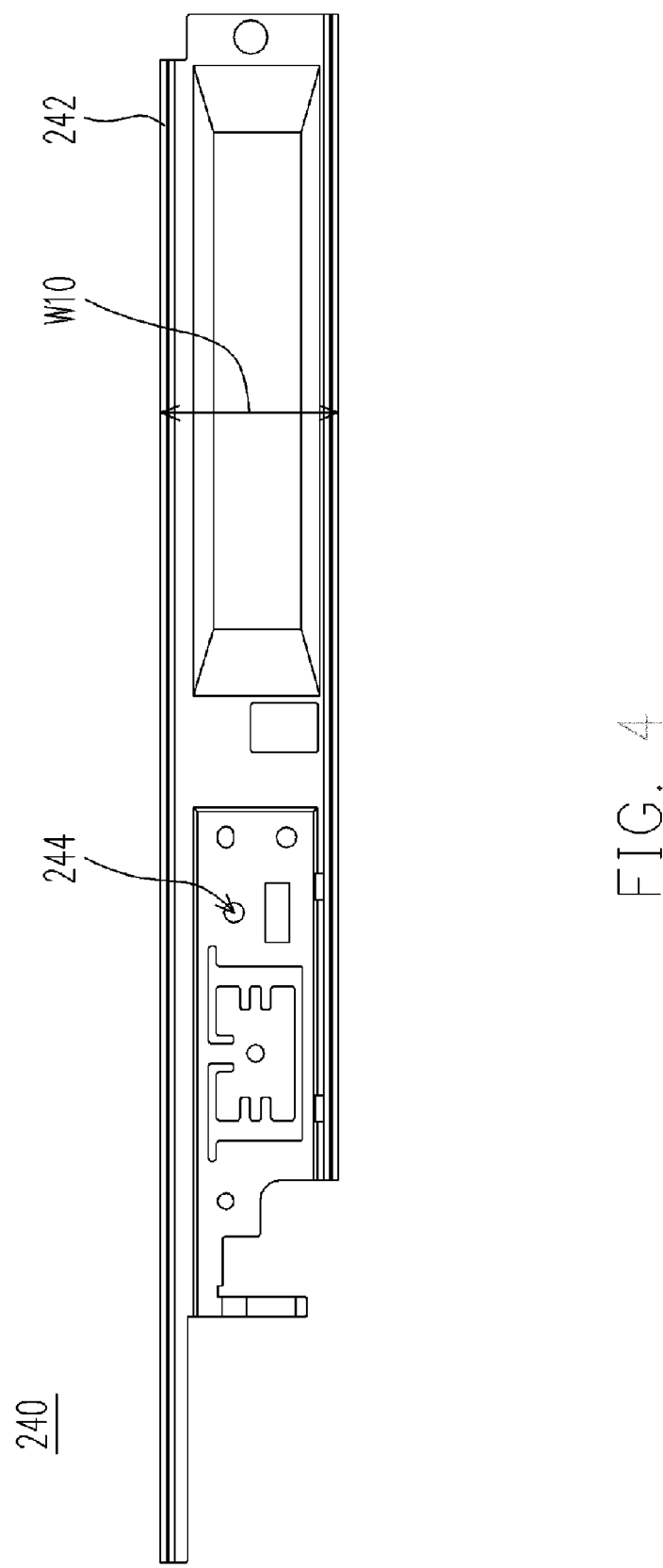
FIG. 4 is a schematic front view of the electro-conductive sheet in FIG. 2
Figure 5:
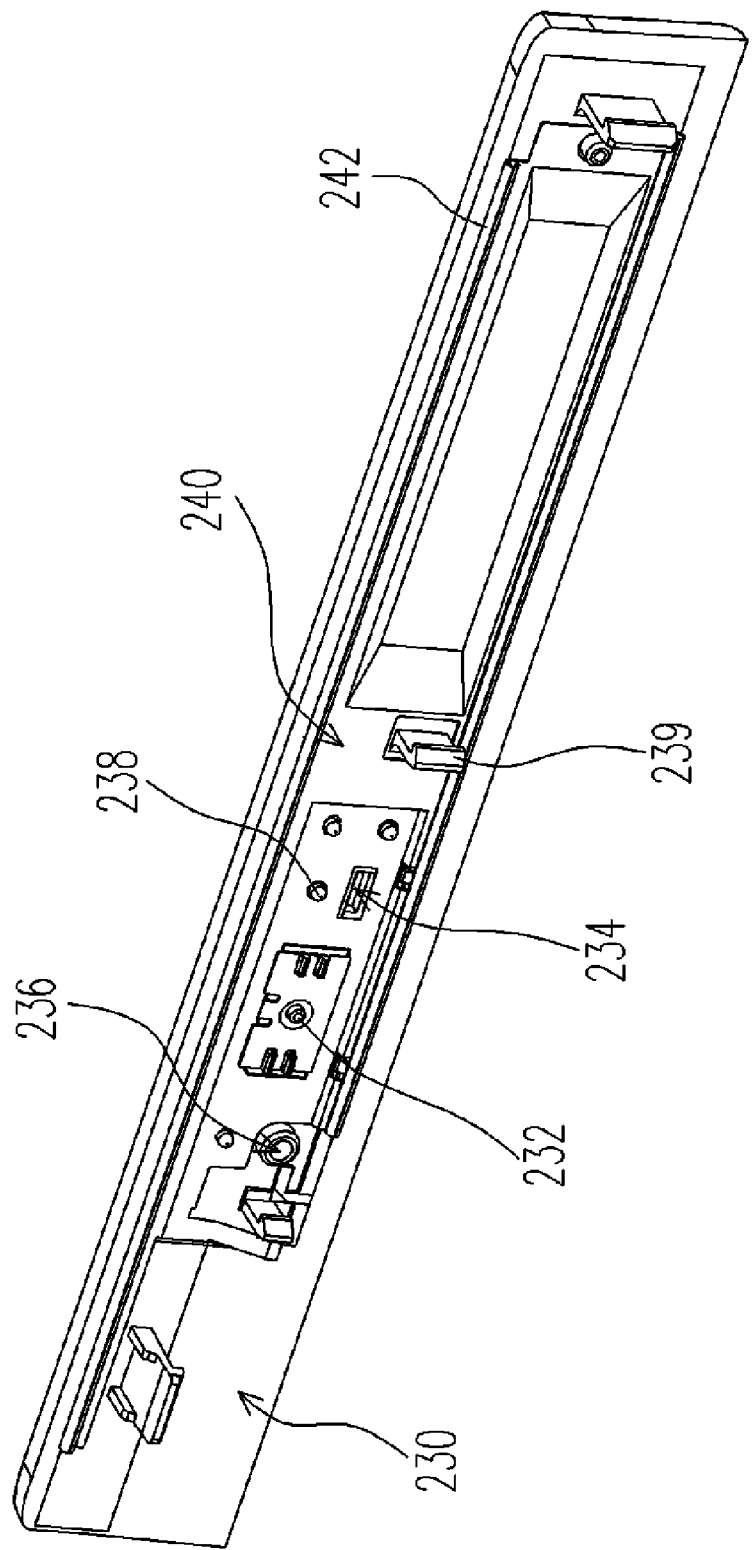
FIG. 5 is a schematic three-dimensional assembly drawing of the bezel and electro-conductive sheet in FIG. 2.

Referring to FIGS. 4 and 5, FIG. 4 is a schematic front view of the electro-conductive sheet in FIG. 2, and FIG. 5 is a schematic three-dimensional assembly drawing of the bezel and electro-conductive sheet in FIG. 2. The electro-conductive sheet 240 has a profile similar to the opening portion 212 of the electro-conductive chassis 210 (referring to FIG. 2). At the two long sides of the electro-conductive sheet 240, there is a curling edge structure 242 as an optional design, respectively. The electro-conductive sheet 240 contacts with the electro-conductive chassis 210 via the curling edge structures 242 (referring to FIG. 3). The curling edge structures 242 make the width dimension of the electro-conductive sheet 240 a little flexible. In fact, the initial width W10 of the electro-conductive sheet 240 can be specified as the height H10 of the opening portion 212 plus a small amount (referring to FIG. 3). Thus, as the tray 220 enters into the electro-conductive chassis 210, the curling edge structures 242 of the electro-conductive sheet 240 will be attached firmly to the electro-conductive chassis 210. Note that in the embodiment, the design that uses the curling edge structures 242 of the electro-conductive sheet 240 to be in contact with the electro-conductive chassis 210 is illustrated as an example. The purpose of the design of the curling edge structures 242 is to guarantee that the electro-conductive sheet 240 can reliably come into contact with the electro-conductive chassis 210. Therefore, regardless a sheet-like electro-conductive sheet 240 with a curling edge design or the other forms of the electro-conductive sheet is acceptable as long as the electro-conductive sheet 240 can reliably come into contact with the electro-conductive chassis 210 to shields the electromagnetic wave.

Referring to FIGS. 2 and 5, the bezel 230 may comprise a button switch 232, a display window 234, a through-hole 236, at least one positioning protrusion 238 and at least one latch 239. Wherein, the button switch 232 is an input interface for ejecting the tray 220 from the electro-conductive chassis 210 by electrical driven mode. The display window 234 is used for displaying lamp signals of the display lamps 222 on the tray 220 to indicate the operation status of the optical disc drive 200. In addition, the through-hole 236 provides a user with assistance during a power cut, where the user can take, for example, an iron wire to reach into the through-hole 236 and contact an emergency exit device (not shown) inside the tray 220 to mechanically eject the tray 220 out of the electro-conductive chassis 210.

Continuing to refer to FIGS. 4 and 5, the electro-conductive sheet 240 further comprises at least one positioning hole 244 corresponding to the positioning protrusion 238 of the bezel 230. During the assembly of the electro-conductive sheet 240 and the bezel 230, the relative positions can be firmly fixed. Besides, a plurality of holes with different shapes corresponding to the button switch 232, the display window 234, the through-hole 236 and the latch 239 on the bezel (referring to FIG. 2) can be located on the electro-conductive sheet 240. Moreover, the electro-conductive sheet 240 and the bezel 230 can be together assembled at the front edge of the tray 220 by means of the latch 239 (referring to FIG. 2).

Referring to FIG. 2, the optical disc drive 200 further comprises a optical disc reading mechanism 250 which at least comprises a turntable 254 and an optical pick-up 252 disposed on the tray 220. While the optical pick-up 254 of the optical disc drive 200 is reading an optical disc (not shown in FIG. 2), the tray 220 stays inside the electro-conductive chassis 210. Meanwhile, the optical disc drive 200 will generate electromagnetic wave with high frequency and high energy.

The electro-conductive sheet 240 is made of metal or other electro-conductive materials, and the electro-conductive sheet 240 covers the opening portion 212 and is in contact with the electro-conductive chassis 210 during operations of the optical disc drive 200 (referring to FIG. 3). Therefore, the electromagnetic wave reached the electro-conductive sheet 240 will be guided to the electro-conductive chassis 210 and be grounded. In this way, the electromagnetic wave is not capable of penetrating through the bezel 230 and leaking from the optical disc drive 200. The problem of the electromagnetic interference (EMI) to the surrounding electronic apparatuses and to the human health is accordingly resolved.

To sum up, the electromagnetic interference (EMI) generated by an optical disc drive not only affects other electronic devices in the computer, but also possibly harms human health. The added electro-conductive sheet in the present invention can effectively prevent the electromagnetic wave from leaking which leads to health damages.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. An optical disc drive, comprising:
an electro-conductive chassis having an opening portion;
a tray, which is disposed inside said electro-conductive chassis for carrying an information storage medium and moves into and from said electro-conductive chassis via said opening portion;
a bezel disposed at a front edge of said tray; and
an electro-conductive sheet, which is disposed between said front edge of said tray and said bezel and substantively covers said opening portion of said electro-conductive chassis;
wherein, said electro-conductive sheet has a curling edge structure, as said tray stays inside said electro-conductive chassis, said curling edge structure of said electro-conductive sheet is in contact with said electro-conductive chassis.

2. The optical disc drive as recited in claim 1, wherein the material of said electro-conductive chassis comprises metal.

3. The optical disc drive as recited in claim 1, wherein the material of said electro-conductive sheet comprises metal.

4. The optical disc drive as recited in claim 1, wherein said bezel covers said opening portion of said electro-conductive chassis.

5. The optical disc drive as recited in claim 1, wherein the width of said electro-conductive sheet is the height of said opening portion plus a small amount.

6. The optical disc drive as recited in claim 1, wherein when said tray enters into said electro-conductive chassis, said electro-conductive sheet is contained in said electro-conductive chassis, and said curling edge structure of said electro-conductive sheet is in contact with said electro-conductive chassis.

* * * * *